Figure 1:
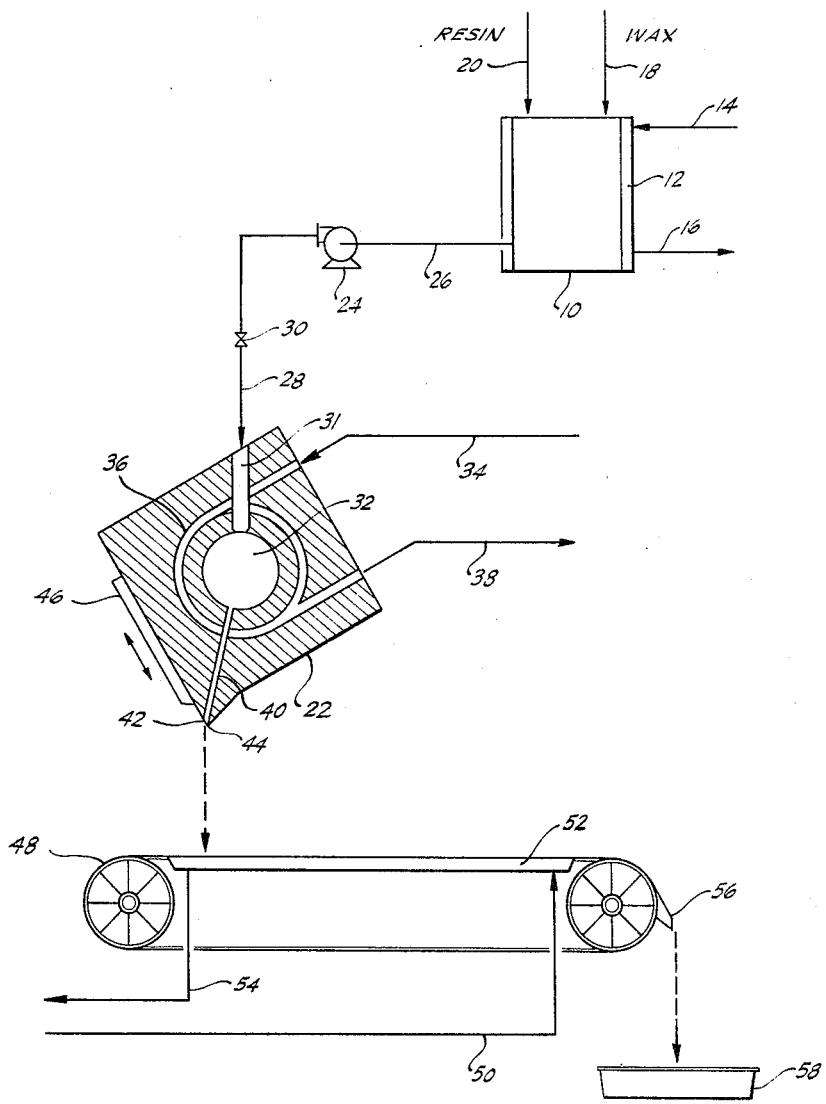

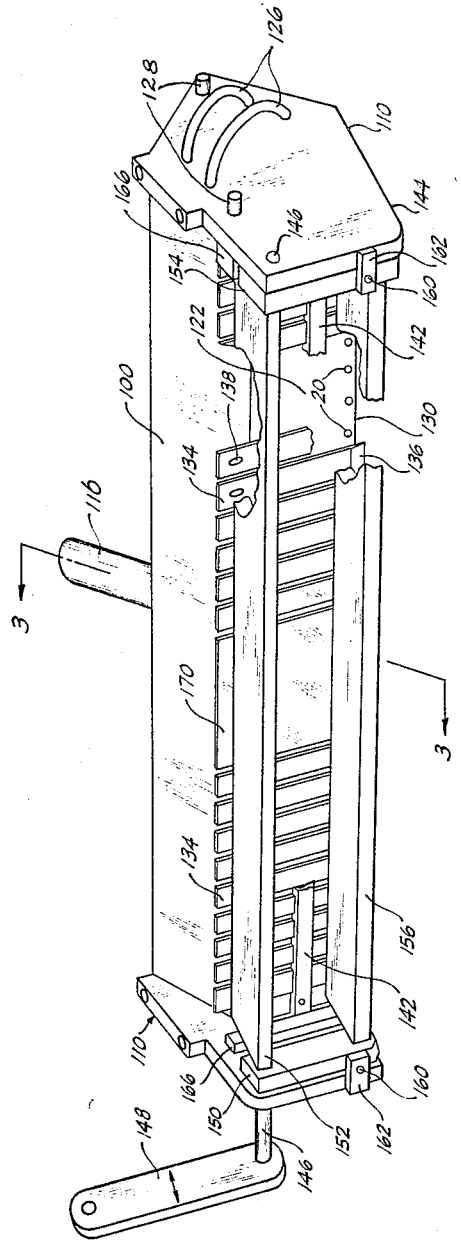

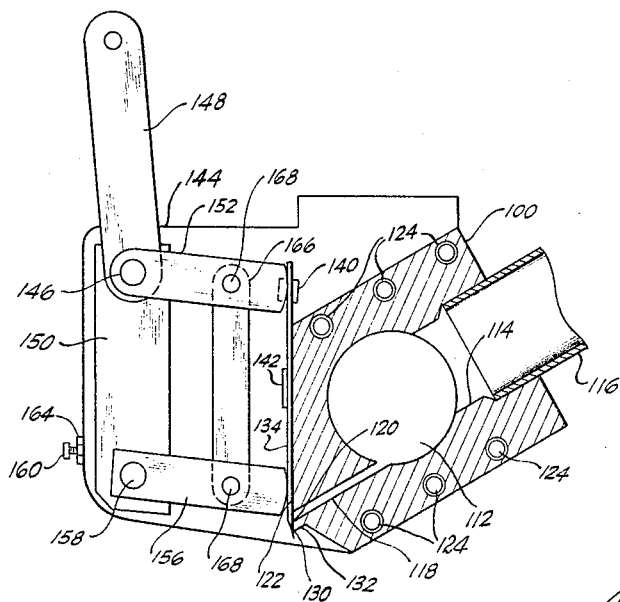

United States Patent Office 3,288,892
Patented Nov. 29, 1966

3,288,892
APPARATUS AND METHOD FOR FORMING
PELLETS
William L. Bewley, Long Beach, and Odell L. Whitfield,
Fullerton, Calif., assignors to Union Oil Company of
California, Los Angeles, Calif., a corporation of California
Filed Jan. 18, 1965, Ser. No. 426,256
13 Claims. (Cl. 264—13)

This invention relates to an apparatus and method for producing normally solid, relatively low-melting materials in pellet form, and in particular concerns an apparatus and method for producing such materials in the form of molten droplets which can be solidified to form pellets.

Within recent years normally solid relatively low-melting materials such as wax, wax-polymer blends, polyethylene and similar plastic materials, have found increasing use in hot-melt coating applications, and it is desirable that such materials be provided in the form of relatively small pellets, granules or the like. Previously, such materials have been prepared in such form by depositing a molten layer of the material on a chilled surface, whereby the material solidifies to form a thin solid sheet, and thereafter comminuting such sheet to form free-flowing flakes, granules, or the like. However, many of such materials cannot be satisfactorily comminuted by conventional mechanical means because of their inherent toughness while other are relatively soft and tend to agglomerate and/or stick to the comminuting means. Consequently, special techniques are required to produce these materials in the desired form, with a resulting increase in production costs.

It is accordingly the principal object of this invention to provide an apparatus and method for forming uniformly sized droplets of normally solid relatively low-melting materials, which droplets when solidified form solid pellets which can be packaged and marketed directly without further comminution by mechanical means.

According to the invention, the composition to be pelletized is melted and caused to flow in molten form through a narrow passageway, the cross-sectional area of which depends upon the size of the pellet to be produced. The passageway terminates in a plane surface adjacent to a cutting edge formed by the intersection of said plane surface with a second plane surface. The angle between said plane surfaces is less than 90° so as to form an acute angle at said cutting edge. A scraper is mounted in contact with the first of the aforesaid surfaces, and is adapted to reciprocate across the cutting edge and across the opening formed by the termination of the passageway in said surface. At one end of its travel, the scraper extends across the cutting edge and closes off the opening to prevent the flow of molten composition therefrom, whereas at the other end of its travel the scraper is drawn back beyond the opening so as to permit the composition to flow from the passageway. By maintaining the proper relationship between the rate at which the composition flows from the opening and the frequency at which the scraper reciprocates, a series of molten composition droplets is caused to form, each of which is pushed from the first of the aforesaid plane surfaces by the scraper. The droplets fall by gravity onto a receiving surface positioned beneath the cutting edge, with the temperature of the receiving surface being controlled so that each drop solidifies substantially immediately upon contacting the same, whereby the composition is obtained in the form of pellets which can be packaged directly from the receiving surface.

The invention will be more fully understood from the following detailed description and the accompanying drawings in which:

FIGURE 1 is a schematic diagram illustrating the general operating principle of the apparatus and method of the invention;
FIGURE 2 is a perspective view of an apparatus constituting one embodiment of the invention;
FIGURE 3 is a sectional view taken along line 3—3 of FIGURE 2;
FIGURE 4 is a partial side view of the aforesaid cutting edge and its contact with the scraper means;
FIGURE 5 is a perspective view of a preferred form of the scraper means;
FIGURE 6 is a partial perspective view of one of the elements constituting the means for reciprocating the scraper means; and
FIGURE 7 is a partial side view of linkage for driving the reciprocating scraper.

Referring now to FIGURE 1, the system illustrated is one adopted for producing a pelletized wax-resin composition. A conventional blending vessel 10 is provided with heating jacket 12 and inlet and outlet lines 14 and 16, respectively, for circulating a heat transfer fluid through jacket 12. Wax is introduced into vessel 10 from supply line 18, and resin is introduced from supply line 20. Within vessel 10 the wax and resin are blended by conventional mixing means, not shown, while circulating steam or hot oil through jacket 12, thereby forming a molten wax-resin blend. The molten blend is transferred from vessel 10 to the pelletizing device 22 by means of pump 24 and lines 26 and 28. Valve 30 is provided to adjust the rate of flow in line 28. Within pelletizing device 22 the blend passes through inlet duct 31 into reservoir 32 wherein it is maintained as a liquid by circulatng a heat transfer fluid through line 34, heating coil 36 surrounding reservoir 32, and line 38. In order to compensate for incidental heat losses, the temperature in vessel 10 is held somewhat higher than that maintained in reservoir 32.

The molten composition passes from reservoir 32 through passageway 40 to form a pool at opening 42 which constitutes the outer terminus of passageway 40 adjacent cutting edge 44. Immediately thereafter, scraper 46 moves downward to scrape the pool from pelletizing device 22 and close off opening 42. The composition forms a droplet and falls by gravity onto endless belt 48 which is maintained at a temperature below the solidification point of said composition by circulating cooling water or the like through line 50, cooling jacket 52, and line 54.

The size of the drop falling on belt 48 (and hence the size of the pellet) is controlled by suitably adjusting the rate of flow through passageway 40 and the time period over which opening 42 remains open. Said flow rate is in turn controlled by the temperature maintained in reservoir 32 and the pressure asserted by pump 24. The range over which the size of the drop can be so controlled is dictated by the diameter of passageway 40.

Substantially immediately after contacting the cooled surface of belt 48, the drop solidifies and is carried to blade 56 which scrapes the drop from the belt, allowing it to fall into storage bin 58.

The pelletizing device 22 of FIGURE 1 is shown in detail in FIGURES 2 through 7, in which like numerals designate like parts. Referring now particularly to FIGURES 2 and 3, the device comprises a body portion 100 taking the form of a metal billet drilled along its longitudinal axis and fitted with end plates 110 to form enclosed reservoir 112. Body portion 100 is drilled transversely to form inlet duct 114 communicating with reservoir 112, with duct 114 being tapped at its outer end to receive supply conduit 116. A plurality of parallel passageways 118, relatively small in diameter (e.g., from $\frac{1}{64}$- to about $\frac{1}{4}$-inch, and preferably from about $\frac{1}{8}$- to about $\frac{1}{4}$-inch), are drilled in body portion 100 to extend outwardly from reservoir 112, transverse to the longitudinal axis thereof and more or less opposite duct 114. Body portion 100 is also drilled longitudinally to form a plurality of ducts 124 adjacent reservoir 112, and end plates 110 are similarly drilled to form openings in register with ducts 124. The latter are connected in series by conduits 126 (suitably constructed of flexible tubing) whereby ducts 124 are constituted as a heating coil through which a suitable heat transfer fluid can be circulated to maintain the contents of reservoir 112 in a molten state. Nipples 128 are provided in one or both of the end plates 110 for introducing and withdrawing the heating fluid.

As is shown in detail in FIGURE 4, a cutting edge 130, adjacent and parallel to the row of openings 120, is formed by the intersection of face 122 and face 132 cut in body portion 100. Angle A between faces 122 and 132 is less than 90°, preferably 30°–75°, in order to minimize any tendency of the drops of wax composition which are formed at openings 120 to run back along face 132.

A plurality of scrapers 134 (one of which is shown in detail in FIGURE 5), equal in number to openings 120, are mounted (by means hereinafter described) so as to bear against face 122 and to be reciprocated as previously described. Each of the scrapers 134 has a beveled cutting edge 136 cut at an angle B of about 30°–75°, and is provided at its opposite end with a hole 138 to engage a drive pin 140. Scrapers 134 are held in spaced relationship corresponding to the spacing of openings 120 by means of spacing bar 142.

Referring again to FIGURES 2 and 3, and also to FIGURE 7, each of end plates 110 comprises an extension 144 extending outwardly from body portion 100 transverse to the axis thereof, and serving to mount the driving mechanism. Extensions 144 are drilled to receive drive shaft 146, one end of which extends beyond end plate 110 to receive rocker arm 148. Between extensions 144, the drive shaft extends through left end block 150, rocker bar 152, and right end block 154. The fit between drive shaft 146, extensions 144, and end blocks 150 and 154 is loose enough to permit rotation of the drive shaft, whereas the fit between the latter and rocker arm 148 and rocker bar 152 is tight, so that when rocker arm 148 is driven back and forth by suitable drive means, not shown, rocker bar 152 is caused to move up and down. As is shown more particularly in FIGURE 6, rocker bar 152 is provided along its inner edge with a series of pins 140 each of which extends through hole 138 in each of scrapers 134, whereby the rocking movement of rocker arm 148 causes the scrapers 134 to reciprocate up and down across openings 120.

Pressure plate 156 is mounted directly below and parallel to rocker bar 152, and is supported at its opposite ends by pins 158 extending into end blocks 150 and 154. Pressure plate 156 is so sized and positioned as to bear against scrapers 134 at their lower ends and urge them firmly against face 122 of body portion 100. The pressure exerted by pressure plate 156 against scrapers 134 may be adjusted by means of adjustment screws 160 threaded into lugs 162 extending inwardly from extensions 144 of end plate 110. Locking nuts 164 maintain the position of locking screws 160. Tie bars 166 are attached by pins 168 to the opposite ends of rocker bar 152 and pressure plate 156 to maintain the latter two elements in fixed alignment.

As will be apparent to those skilled in the art a number of modifications and design variations may be made without departing from the principle of the invention. For example, as indicated in FIGURE 2, a single scraper means 170 may be employed as the equivalent of individual scraper 134. Similarly other arrangements for effecting reciprocation of scraper means 134 may be employed, and the reservoir may be heated by electrical means. The invention is thus to be considered limited only by the scope of the following claims and the equivalent thereof.

We claim:
1. Apparatus for producing pellets of a normally solid meltable material such as wax comprising: a body portion enclosing a reservoir for said material, said body portion having first and second exterior faces intersecting at an angle less than 90° to form a cutting edge; means for introducing said material into said reservoir; conduit means extending from said reservoir to an opening in said first face adjacent said cutting edge; a scraper in register with said first face and in alignment with said opening; means for reciprocating said scraper between a first position whereby said molten material is permitted to flow from said opening, and a second position whereby molten material which has issued from said opening is scraped from said first face and flow of said material from said opening is prevented; and means for receiving said material scraped from said first face, said last-named means being maintained at a temperature below the solidification temperature of said material.

2. Apparatus as defined by claim 1 wherein the body portion is provided with heating means for maintaining said material in the molten state within said reservoir.

3. Apparatus for producing pellets of a normally solid meltable material such as wax comprising: a body portion enclosing a reservoir for said material, said body portion having first and second faces intersecting at an angle less than 90° to form a cutting edge; means for introducing said material into said reservoir; a plurality of conduit means extending from said reservoir to a like plurality of openings in said first face adjacent said cutting edge; a scraper in register with said first face; means for reciprocating said scraper from a first position whereby said molten material is permitted to flow from said openings, to a second position whereby material which has issued from said openings is scraped from said first face and flow of said material from said openings is prevented; and means positioned below said cutting edge to receive said material scraped from said first face, said last-named means being maintained at a temperature below the solidification temperature of said material.

4. Apparatus as defined by claim 3 comprising a like plurality of scrapers, each of which is in register with said first face and is in alignment with one of said openings; and means for reciprocating each of said scrapers between said first and second positions.

5. Apparatus as defined by claim 3 wherein said means for receiving material scraped from said first face comprises an endless belt.

6. Apparatus as defined by claim 3 wherein the body portion is provided with heating means for maintaining said material in the molten state within said reservoir.

7. Apparatus for producing pellets of a normally solid meltable material such as wax comprising: a body portion enclosing a reservoir, said body portion having first and second faces intersecting at an angle less than 90° to form a cutting edge; means for introducing a meltable composition into said reservoir from an exterior source thereof; heating means for maintaining said composition in the molten state within said reservoir; conduit means extending from said reservoir to an opening in said first face adjacent said cutting edge; a scraper engaging said first face in sliding contact and in alignment with said opening; means for reciprocating said scraper between a first position whereby molten composition is permitted to flow from said opening, and a second position whereby molten composition which has issued from said opening is scraped from said first face and flow of said molten composition from said opening is prevented.

8. Apparatus for producing pellets of a normally solid meltable material such as wax comprising: a body portion enclosing a reservoir, said body portion having first and second faces intersecting at an angle less than 90° to form a cutting edge; means for introducing a meltable composition into said reservoir from an exterior source thereof; heating means for maintaining said composition in the molten state within said reservoir; a plurality of conduit means extending from said reservoir to a like plurality of openings in said first face adjacent said cutting edge; a like plurality of scrapers each of which engages said first face in sliding contact and is in alignment with one of said openings; and means for reciprocating said scrapers between a first position whereby molten composition is permitted to flow from said openings, and a second position whereby molten composition which has issued from said openings is scraped from said first face and flow of said molten composition from said openings is prevented.

9. A device as defined by claim 6 including means for urging said scrapers against said first face.

10. A device as defined by claim 6 wherein the angle of intersection between said first and second faces is between about 30° and about 75°.

11. A device as defined by claim 6 wherein said heating means comprises a duct extending through said body portion adjacent said reservoir; and means for circulating a heat transfer fluid through said duct.

12. Apparatus for producing pellets of a normally solid meltable material such as wax comprising an elongated body portion having a chamber extending between its opposite ends along the longitudinal axis thereof, said body portion comprising an exterior planar first face and an exterior second face intersecting at an angle between about 30° and about 75° to form a cutting edge; end plates affixed to the opposite ends of said body portion and closing said chamber; an inlet duct extending transversely within said body portion from said chamber to an opening in an exterior face thereof; a plurality of heating ducts extending longitudinally within said body portion adjacent to said chamber; means for connecting said heating ducts in series; means for circulating a heat transfer fluid through said heating ducts; a plurality of passageways extending transversely within said body portion from said chamber to a like plurality of openings in said first face; a like plurality of scrapers each of which engages said first face in sliding contact and is in alignment with one of said openings; means for reciprocating said scrapers in a substantially vertical plane from an upper position above said openings to a lower position below said cutting edge; and adjustable means for urging said scrapers against said first face.

13. A method for producing substantially uniformly sized pellets of a meltable composition of matter which comprises:

maintaining a liquid reservoir of said molten composition;

flowing said molten composition from said reservoir through a conduit communicating with said reservoir and terminating at an opening in a first plane surface adjacent a downwardly directed cutting edge formed by the juncture of said first plane surface and a second plane surface intersecting at an acute angle of less than 90°, so that a drop of said molten composition is formed at said opening which extends outwardly from said opening beyond said first plane surface;

passing a scraper reciprocally along said first plane surface so as to sever said drop causing it to fall by gravity from said first plane surface, said scraper obstructing the flow of said molten composition from said conduit immediately upon severing said drop; and collecting said severed drop on a receiving surface located beneath said opening and maintained at a temperature below the solidification temperature of said composition whereby said severed drop is solidified.

References Cited by the Examiner
UNITED STATES PATENTS

| | | | |
|---|---|---|---|
| 2,566,567 | 9/1951 | Hutchinson et al. | 18—2.4 |
| 2,979,764 | 4/1961 | Andrew | 18—2.7 |

ROBERT F. WHITE, *Primary Examiner.*

F. S. WHISENHUNT, J. R. HALL, *Assistant Examiners.*